I. ROSENBLUM.
PROCESS FOR TREATING SILICA.
APPLICATION FILED MAR. 31, 1917.
1,229,324.
Patented June 12, 1917.
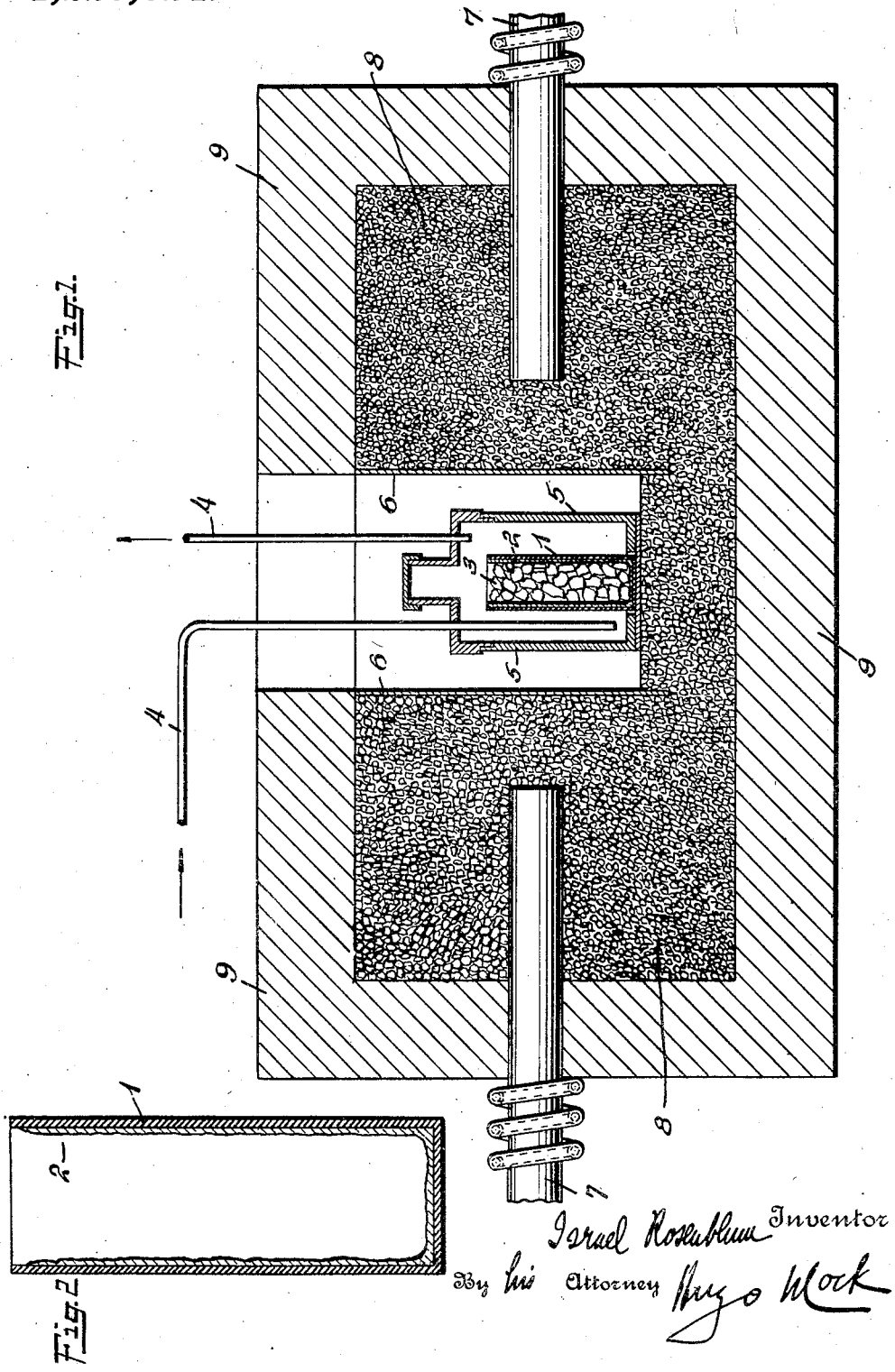
Israel Rosenblum, Inventor
By his Attorney Hugo Mock

UNITED STATES PATENT OFFICE.

ISRAEL ROSENBLUM, OF SWAMPSCOTT, MASSACHUSETTS.

PROCESS FOR TREATING SILICA.

1,229,324.  Specification of Letters Patent.  Patented June 12, 1917.

Application filed March 31, 1917. Serial No. 158,953.

*To all whom it may concern:*

Be it known that I, ISRAEL ROSENBLUM, a subject of the King of Roumania, residing at Swampscott, in the county of Essex and State of Massachusetts, have invented certain new and useful Improvements in Processes for Treating Silica, of which the following is a specification.

My invention relates to the production of articles from molten quartz or pure silica and has for its object the production of silica articles made therefrom in relatively large pieces free from any impurities.

Another object of my invention is the cheapening of the production of articles made from quartz as at present same are made in crucibles of iridium or similar costly metals in small quantities in which the cost of production is necessarily high.

A further object of my invention is the production of completed quartz articles in a pure condition in the form of rods, tubes, crucibles, beakers and containers of various sizes.

It is well known that by heating quartz in an electric furnace in a graphite crucible, to a temperature where quartz is plastic, the quartz is contaminated by the carbon chemically as well as mechanically. It is therefore impossible to obtain pure transparent quartz in the ordinary manner in graphite crucibles.

I have discovered that if a transparent quartz tube is slipped over a graphite rod and heated to a temperature between 1400 degrees centigrade to 1600 degrees centigrade in a nitrogen atmosphere, a compound of silicon, nitrogen and carbon is formed which acts as a protective coating over the graphite rod and prevents further action on the graphite by the quartz. As the melting point of the compound of silicon, nitrogen and carbon when once formed is far above the temperature needed to render the quartz plastic which is about 1800 degrees centigrade, it follows that this compound acts as a protective layer not permitting the quartz to be contaminated by the graphite.

Taking advantage of the discovery of the formation of a compound of silicon, nitrogen and carbon which has a very high melting point and does not react with quartz at temperatures where quartz is plastic and protects the graphite from further action upon quartz, I have developed a cheap method for manufacturing pure transparent quartz in graphite crucibles, in a nitrogen atmosphere.

In practice, after the initial protective coating has been formed, instead of nitrogen, illuminating gas or other inert gases may be used. When the quartz is thus in a liquid state free from bubbles and free from impurities, I am then enabled to work same in the ordinary manner by blowing, pressing drawing or by other known methods by which molten silica can be operated upon.

I find however that in this process I can obtain relatively larger masses of pure silica to operate with than in the processes hitherto known.

Figure 1 is a sectional view of an apparatus showing the operation of my invention, and Fig. 2 is an enlarged sectional view of the graphite crucible showing the thin layer of protective coating which prevents the contamination of the quartz by the body of the crucible.

1 is a graphite crucible; 2 is the protective lining formed by interaction of nitrogen, carbon of the crucible, and quartz-vapors; 3 represents the mass of quartz to be operated upon; 4 represents the piping conveying the current of nitrogen; 5 represents a graphite chamber with cover through which the conveying pipes arrive; 6 represents the graphite wall of the electric furnace; 7 represents the graphite water cooled electrodes of the furnace; 8 represents the coke or graphite particles with which the electric furnace is packed; and 9 represents the outer lining of the electric furnace.

What I claim is:—

1. A process of treating quartz in an electric furnace in a graphite crucible in the presence of oxygen-free nitrogen gas.

2. A process of treating quartz in an electric furnace in a crucible containing carbon in the presence of oxygen-free nitrogen.

3. A process of treating quartz in a graphite crucible in an electric furnace by forming a protective layer on said crucible through the interaction of a portion of the material to be treated and the lining of the crucible and then raising the temperature for the liquefaction of the quartz.

4. A process of preparing a composition of matter by subjecting carbon to the action of quartz in an electric furnace in the presence of oxygen-free nitrogen gas.

5. A process of producing a composition of matter by subjecting carbon to the action of quartz in the presence of oxygen-free nitrogen gas at a temperature of approximately 1600 degrees centigrade.

6. A process of producing a new composition of matter by treating quartz in a graphite crucible in an electric furnace from 1400 to 1700 degrees centigrade in the presence of oxygen-free nitrogen gas.

In testimony whereof I hereunto affix my signature.

ISRAEL ROSENBLUM.